INVENTORS
GEOFFREY NORMAN DITCHBURN
FREDERICK HAROLD THOMAS FOY
By Norris + Bateman, Attorneys United States Patent Office 3,340,702
Patented Sept. 12, 1967

3,340,702
LIQUID COOLING APPARATUS
Geoffrey N. Ditchburn, Upper Colwyn Bay, North Wales, and Frederick H. T. Foy, St. Annes, England, assignors to Ditchburn Vending Machines Limited, Lytham, England, a corporation of Great Britain
Continuation of application Ser. No. 388,373, Aug. 10, 1964. This application June 7, 1966, Ser. No. 555,924
5 Claims. (Cl. 62—139)

ABSTRACT OF THE DISCLOSURE

The present invention is concerned with a device for rapidly cooling small quantities of water to which may be optionally added carbonation syrup prior to the water being dispensed. The primary components consist of a water tank holding cooling holdover water, a source of water coils immersed in the holdover water tank connected to the water source, a carbonation chamber connected in a branch line from the cooling coils and a dispensing outlet. An impeller is mounted within one of the cooling coils at the top portion thereof for causing water circulation of the holdover water. A refrigeration system is provided which is controlled by a temperature sensor inside the holdover tank. The refrigeration system is operated to build up ice in the holdover tank until such time as the ice build up touches the sensor, at which time the refrigeration is terminated. Syrup can be optionally added at the dispensing spout.

This application is a continuation of application Ser. No. 388,373 filed Aug. 10, 1964, now abandoned.

For many purposes it is necessary to cool small quantities of liquids rapidly, and also to rapidly cool a succession of small quantities of liquids. This is a requirement for a machine for vending cool beverages, otherwise it would be necessary to maintain a body of liquid cool at all times so that the small quantities could be drawn off as and when required. However, it is undesirable to maintain a substantial quantity of liquid cool in such machines, and consequently it has been proposed in cool beverage vending machines to pass the small quantity of liquid that is to be dispensed through a tube that is in close contact with a tube through which coolant is circulated and which forms part of a refrigerating apparatus. However, although this arrangement can be made effective, it is inefficient in that in order to obtain the required rapid cooling of the liquid to be dispensed, a relatively large refrigerating apparatus is necessary.

The present invention is designed to provide means whereby small quantities of liquids can be rapidly cooled, for example as the liquid is being fed into a cup in which it is to be dispensed, but which will be effective with a relatively small refrigerating apparatus.

According to the invention, liquid to be cooled is passed through a pipe immersed in a body of water and means are provided for maintaining a pre-determined quantity of ice in the said body of water. Preferably means are provided for circulating the water between the ice and the pipe through which the liquid to be cooled is passed.

Figures 1, 3:
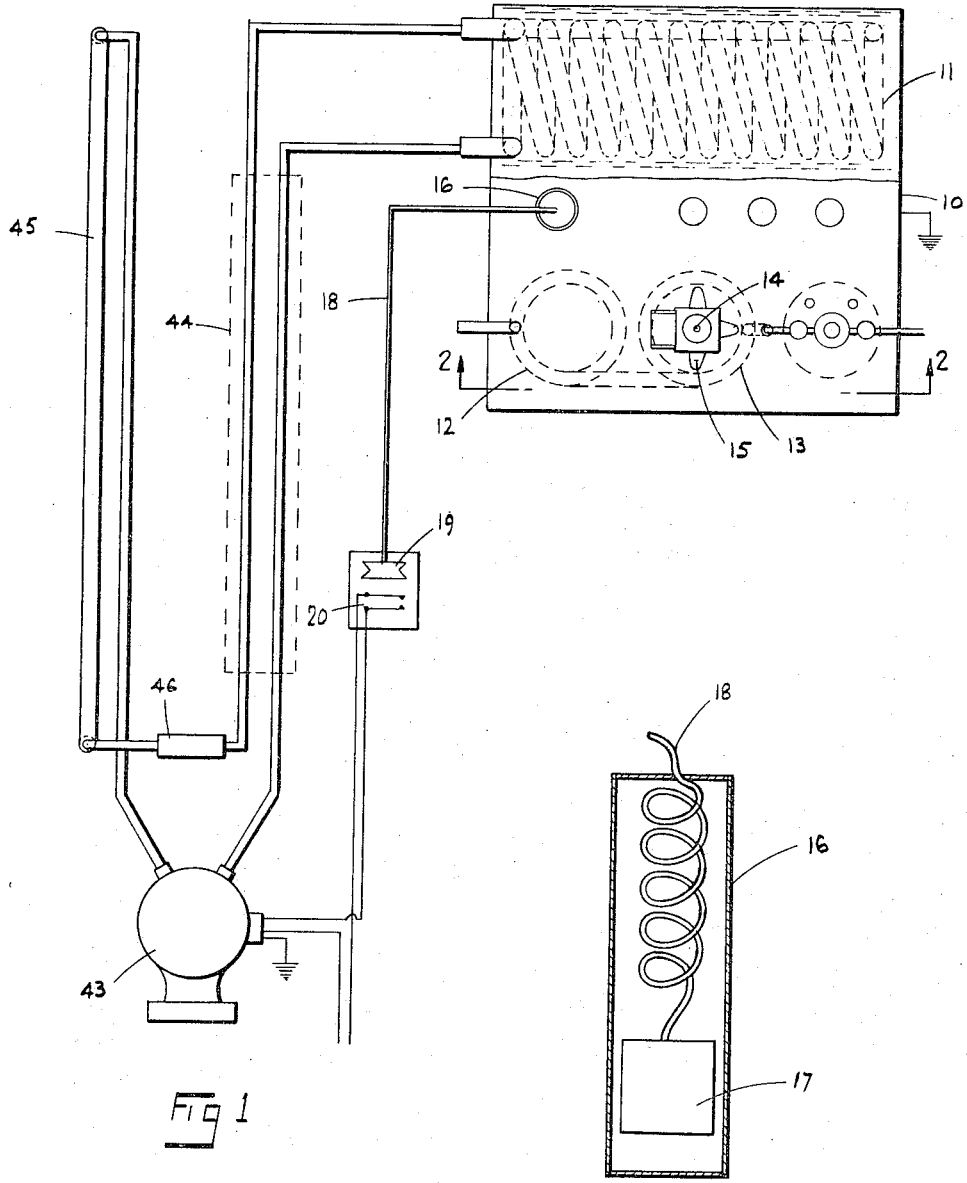
Figure 2:
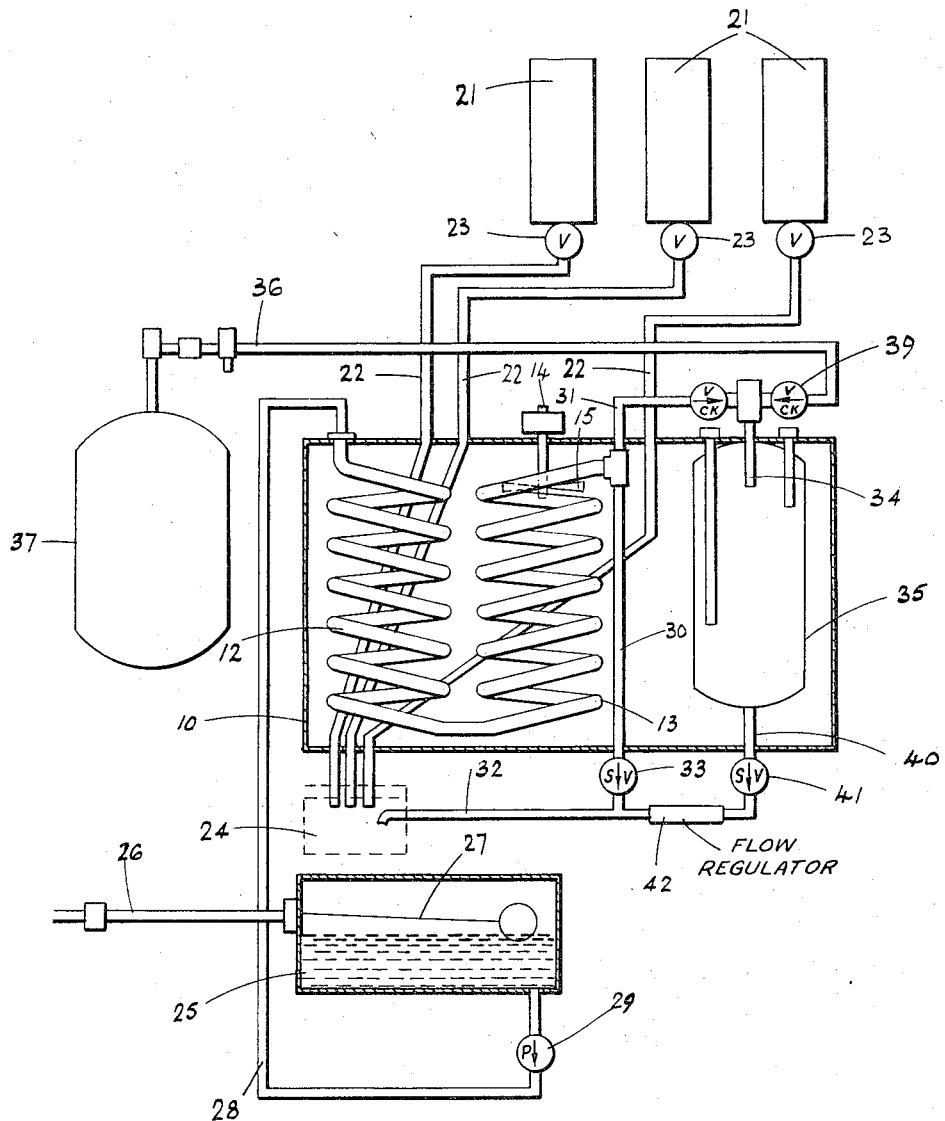

One particular construction of means for maintaining a predetermined quantity of ice in a body of water, and designed primarily for use in a machine for vending cool liquids, will now be described with reference to the accompanying drawings, in which:

FIGURE 1 is a diagrammatic plan view of a refrigerating apparatus for this purpose, FIGURE 2 is a diagrammatic elevation of part of the apparatus of FIGURE 1 but also showing some associated apparatus, and FIGURE 3 is a diagrammatic sectional elevation of a sensing head incorporated in the apparatus of FIGURE 1.

Referring to the drawings, the apparatus illustrated is intended for incorporation in a machine for vending cool beverages, but as the invention is concerned with the means for rapidly cooling the liquid to be dispensed only, the coin-freed mechanism and other parts of the machine will not be described as these may be of any convenient or known construction. The apparatus comprises a tank 10 for containing a body of water. A cooling coil 11, that is a coiled tube through which coolant is circulated by the refrigerating unit, is disposed in one end portion of the tank 10, and a second coiled tube for the liquid to be cooled, is disposed in the other end portion of the tank. The second coiled tube having two coils 12 and 13 is connected to supply and delivery pipes for the liquid in a usual way. However, each of the coils 12 and 13 of the said second coiled tube is coiled about a vertical axis and a vertical shaft 14 coaxial with the said coil 13 projects into the tank through a bearing in a cover on the tank and has an impeller 15 on its lower end within the said coil.

With the tank filled with water, the coolant circulating through the first mentioned or cooling coil, ice will build up around the cooling coil 11, and means responsive to the build up of ice are provided for controlling the operation of the refrigerator unit. Any convenient means may be used for this purpose, but in this particular construction a known sensing device is used. This sensing device 16, which is disposed within the tank 10 at a predetermined distance from the cooling coil 11, is illustrated in FIGURE 3 and comprises a tubular container 16, closed at both ends, and a short metal cylinder 17, which is a close fit within the tubular container, disposed in the lower end of the tubular container. The short metal cylinder 17 is filled with water and a capillary tube 18 is connected to a small opening in one end of the said cylinder 17, the capillary tube 18 extending outside the tank has its other end connected to pressure responsive means 19 incorporating an electric switch 20 included in the electric control circuit of the refrigerator unit. It will be seen therefore that when the build up of ice around the cooling coil reaches the sensing device 16, the water in the cylinder 17 will freeze thus increasing the pressure therein and this pressure increase will be transmitted through the capillary tube 18 to the pressure responsive means 19.

Referring now to FIGURE 2 of the drawings, syrup to be mixed with cooled water is contained in tanks 21, each for a different syrup, and discharge pipes 22 controlled by valves 23 extend from the tanks 21 to a cup station 24. Water to be cooled prior to feeding to the cup station 24 is contained in a tank 25 which is supplied by a pipe 26 connected to a main water supply and the level of water in the tank 25 is controlled by a ball valve 27. A pipe 28 is connected between an outlet opening in the tank 25 and one end of the coiled tube 12, a pump 29 being interposed in the pipe 28. The outlet end of the coiled tube 13 is connected to pipes 30 and 31, the pipe 30 leading to a discharge pipe 32 which terminates at the cup station 24, a solenoid-controlled valve 33 being interposed in the pipe 30. The pipe 31 is conected to a water inlet jet 34 in a carbonating chamber 35, and a gas supply pipe 36 is connected between the water inlet jet 34 and a cylinder 37 containing $CO_2$ gas. Non-return valves 38 and 39 are interposed in the pipes 31 and 36, respectively. A pipe 40 is connected between an outlet opening of the carbonating chamber 35 and the discharge pipe 32, a solenoid-controlled valve 41 and a flow regulator 42 being interposed in the pipe 40.

The refrigerating apparatus shown in FIGURE 1, includes usual equipment, i.e., a compressor 43, a heat exchanger 44 through which the coolant for the cooling coil 11 is passed, a static condenser 45 and a filter/drier 46.

In use, the refrigerator unit will be controlled by the sensing device 16 to maintain a predetermined quantity or thickness of ice around the cooling coil 11, and consequently the body of water in the tank will be maintained substantially at freezing point. When a quantity of liquid is to be dispensed, the impeller 15 will be rotated by means of a small electric motor on the end of the shaft 14 outside the tank and so will impell water downwardly through the column defined within the coiled tube 13, and at the same time the liquid to be cooled will be passed through the coils 12 and 13 by means of the pump 29. Heat will therefore be transferred from the liquid through the walls of the tube coils 12 and 13 to the water in the tank 10, and the water so heated will be caused to flow downwardly by the impeller 15 and will be replaced by water from the area surrounding the ice.

The cooled liquid after passing through the coils 12 and 13 will be fed either directly to the cup station 24 or through the carbonating chamber as determined by operation of the solenoid-operated valves 33 and 41 and at the same time syrup will be supplied to the cup station 24 from one of the tanks 21 according to which valve 23 is operated.

It will be appreciated that the relative positions in the tank 10 of the cooling coil 11, the tube coils 12 and 13, and the sensing device 16 are important and preferably should be substantially as shown in the drawings. In particular, the location of the sensing device 16 relatively to the cooling coil 11 will determine the thickness or quantity of ice around the cooling coil 11.

We claim:

1. Apparatus for dispensing small quantities of cooled liquids comprising a tank adapted to contain water, a refrigerating system having a coolant coil submerged in the water in one part of said tank, means forming a part of said refrigerating system for circulating a coolant through said coil to reduce the water temperature in said one part of said tank, coil means comprising first and second serially connected coils respectively having inlet and outlet ends and being immersed in the water in another part of said tank in spaced relation to said coolant coil, a source of liquid supply connected to said inlet end, dispensing conduit means connected to said outlet end and providing a discharge outlet outside said tank, said second coil being coiled about an upstanding axis to delimit a cylindrical space respectively opening at opposite ends adjacent to said outlet end and to the other end of said second coil that is connected to said first coil, said outlet end being disposed at the upper end of said second coil and above said other end, an impeller received in said cylindrical space for directing water axially downwardly through said space towards said other end of said second coil, means for driving said impeller to circulate the cooler tank water from said one part of said tank and downwardly through said space effectively in countercurrent flow to the liquid supply transmitted through said second coil, and sensing means disposed in said tank and being responsive to the temperature in said one part of said tank for controlling operation of said refrigerating system to maintain the water around said coolant coil substantially at the freezing point.

2. The apparatus defined in claim 1 wherein said first coil is disposed in side-by-side relation with said second coil and is coiled about axis that is parallel to that of said second coil.

3. The apparatus defined in claim 2 wherein said impeller is coaxially disposed in the upper end of said space adjacent to said outlet end.

4. The apparatus defined in claim 1 wherein said sensing means comprises a temperature sensing bulb filled with water, a pressure responsive device, a capillary tubing interconnecting said bulb and said pressure responsive device, an electrical circuit containing a switch under the control of said pressure responsive device and being actuatable thereby to control operation of said refrigerating system, said bulb being disposed at a predetermined distance from said coolant coil such that a predetermined build-up of ice on said coolant coil freezes the water in said bulb to cause the pressure therein to increase, the pressure increase in said bulb being transmitted through said capillary tubing to said pressure responsive device for actuating said switch to stop operation of said refrigerating system.

5. The apparatus defined in claim 4 comprising carbonating means immersed in the water in said tank, conduit means connecting said carbonating means between said discharge outlet and said outlet end, and valve means for selectively directing the liquid supply through said carbonating means or said dispensing conduit means.

References Cited

UNITED STATES PATENTS

| | | | |
|---|---|---|---|
| 2,039,556 | 5/1936 | Ruse | 62—399 X |
| 2,300,058 | 10/1942 | Osborn et al. | 62—399 |
| 2,563,935 | 8/1951 | Huffman et al. | 62—139 |
| 2,973,630 | 3/1961 | Kriechbaum | 62—139 |
| 3,056,273 | 10/1962 | Cornelius | 62—396 X |

ROBERT A. O'LEARY, *Primary Examiner.*

W. E. WAYNER, *Assistant Examiner.*